United States Patent
Eshel et al.

(10) Patent No.: US 11,936,779 B1
(45) Date of Patent: Mar. 19, 2024

(54) QUANTUM KEY DISTRIBUTION WITH SINGLE DETECTOR AND INTERFEROMETER BASED OPTICAL SWITCH

(71) Applicant: Triarii Research Ltd., Netanya (IL)

(72) Inventors: Yoni Eshel, Tel Aviv (IL); Ran Ditcovski, Mazor (IL); Doron Bar-Lev, Netanya (IL)

(73) Assignee: Triarii Research Ltd., Netanya (IL)

( * ) Notice: Subject to any disclaimer, the term of this patent is extended or adjusted under 35 U.S.C. 154(b) by 0 days.

(21) Appl. No.: 18/089,680

(22) Filed: Dec. 28, 2022

(51) Int. Cl.
*H04L 9/08* (2006.01)
*H04B 10/70* (2013.01)

(52) U.S. Cl.
CPC ............ *H04L 9/0852* (2013.01); *H04B 10/70* (2013.01)

(58) Field of Classification Search
CPC .............................. H04B 10/70; H04L 9/0852
USPC ........................................................ 380/256
See application file for complete search history.

(56) References Cited

U.S. PATENT DOCUMENTS

| | | | | |
|---|---|---|---|---|
| 7,088,824 | B1 * | 8/2006 | Takeuchi | H04B 10/00 380/256 |
| 10,333,701 | B2 | 6/2019 | Kwiat | |
| 10,951,324 | B2 * | 3/2021 | Lucamarini | H04B 10/54 |
| 11,522,689 | B2 * | 12/2022 | Wang | H04L 9/0852 |
| 2018/0191496 | A1 * | 7/2018 | Duplinskiy | H04L 9/0855 |
| 2020/0387016 | A1 * | 12/2020 | Diroll | G02F 1/01716 |

FOREIGN PATENT DOCUMENTS

| | | | | |
|---|---|---|---|---|
| CN | 112033528 A | * | 12/2020 | ............ G01J 1/0488 |
| CN | 214748771 U | * | 11/2021 | |
| CN | 115479679 A | * | 12/2022 | |
| EP | 3848671 A2 | * | 7/2021 | ............. G01C 19/72 |
| GB | 2492083 A | * | 12/2012 | ............. H04B 10/70 |
| WO | WO-2014169321 A1 | * | 10/2014 | ........... G02B 6/1225 |
| WO | WO-2017180736 A1 | * | 10/2017 | ......... G02B 6/29343 |
| WO | WO-2022076982 A1 | * | 4/2022 | |
| WO | WO-2022087295 A1 | * | 4/2022 | ........... G01D 5/2492 |

OTHER PUBLICATIONS

Nishioka et al; 'Circular type' quantum key distribution; Feb. 2008; IEEE photonics and pp. 1-5. (Year: 2008).*
Nishioka et al; Circular type' quantum key distribution; Apr. 2002; IEEE Photonics Technology Letters, vol. 14, No. 4, pp. 1-3. (Year: 2002).*

* cited by examiner

Primary Examiner — Amritbir K Sandhu (57) ABSTRACT

A method and an apparatus for receiving quantum optical communication while reducing receiver, increasing maximum detection speed, or both. The disclosure comprises transforming the polarization encoded output of a QKD system to time-bin encoded output at the detector level. The disclosure also comprises a method and an apparatus using a quantum optical switch and several SPD units to increase communication speed.

28 Claims, 5 Drawing Sheets

QUANTUM KEY DISTRIBUTION WITH SINGLE DETECTOR AND INTERFEROMETER BASED OPTICAL SWITCH

FIELD AND BACKGROUND OF THE INVENTION

The present invention, in some embodiments thereof, relates to digital communication, sensing, and computing, and, more particularly, but not exclusively, effective use of single photon detectors (SPD).

Quantum key distribution (QKD) systems may benefit from the uncertainty principle mitigating attempts to eavesdrop without being detected. Some QKD systems use photon polarization to convey information. Single photon detectors (SPD) may be an expensive component required by QKDs, and increase the size, weight, power consumption and price of QKD systems. This limits the use of QKD systems for small, handheld applications. The SPDs may also be the bottleneck for operation speeds, due to long recovery times and slow gating frequencies.

Free space QKD systems may utilize four detectors, for four distinct polarization states. There also QKD systems with three detectors, where two are used for data encoding, and one is used for security purposes. One may also encode data with phase-based protocols which utilize a single detector for data transmission and a second detector for security needs. These phase base QKDs schemes require two SPDs, however these schemes may be less apt for free space QKD.

The long dead-time limit for detection may be mitigated using super conductive single nanowire SPDs (SNSPDs). The dead time of these detectors is very short (order of few nanoseconds), which increases the possible bitrate. However, these detectors are more expensive, require ultra-high vacuum environment and liquid helium temperature to work properly, limiting their use to well-controlled environments and high-cost applications.

SUMMARY OF THE INVENTION

It is an object of the present disclosure to describe an apparatus and a method for receiving secure transmission on a transmission link, using a plurality of delay media to reduce the number of SPDs required.

According to an aspect of some embodiments of the present invention there is provided an apparatus for receiving secure transmission on a transmission link, comprising:
  receiving optics effective to receive output light of the output optics from a light source;
  a beam splitter for receiving light from the receiving optics, where at least one photon received is either transmitted by the beam splitter or reflected by the beam splitter;
  at least one polarization beam splitter for receiving the at least one photon to output at least one informative bit value;
  a plurality of physically separated delay media, each delay medium is characterized by a different, specified delay; and
  a device for receiving the at least one photon in a measured timing where data comprising the at least one informative bit values is indexed by the measured timing.

According to an aspect of some embodiments of the present invention there is provided a method for receiving secure transmission on a transmission link, comprising:
  receiving at least one photon using receiving optics effective to receive output light of the output optics from a light source;
  using a beam splitter for receiving light from the receiving optics, where the at least one photon received is either transmitted by the beam splitter or reflected by the beam splitter;
  using at least one polarization beam splitter for receiving the at least one photon to output at least one informative bit value;
  transmitting the at least one photon through one of a plurality of physically separated delay media, each delay medium is characterized by a different, specified delay; and
  receiving the at least one photon by a device in a measured timing where data comprising the at least one informative bit values is indexed by the measured timing.

According to an aspect of some embodiments of the present invention there is provided a method for receiving an optical signal, comprising:
  receiving at least one photon using receiving optics effective to receive output light of the output optics from a light source;
  using a quantum optical switch for delivering the at least one photon to one of separate single photon detectors, selected by a timing scheme; and
  receiving the at least one photon by the separate single photon detectors.

According to an aspect of some embodiments of the present invention there is provided a method for receiving an optical signal, comprising:
  receiving at least one photon using receiving optics effective to receive output light of the output optics from a light source;
  using a quantum optical switch for delivering the at least one photon to one of separate optical outputs, selected by the switch phase control wherein a first output of a first quantum optical switch is connected to an input of a second quantum optical switch, and a second output of the first quantum optical switch is connected to an input of a third quantum optical switch; and
  sending the at least one photon to at least one separate optical process.

Optionally, the device comprising a single photon detector.

Optionally, further comprising a quantum optical switch and the outputs of the quantum optical switch are connected to separate single photon detectors.

Optionally, the separated delay media is combined with a plurality of quantum optical switches.

Optionally, the plurality of quantum optical switches are based on optical interferometers, selected from a group consisting of Mach-Zehnder interferometers (MZI), Michelson interferometer, and Sagnac interferometer.

Optionally, the quantum optical switches comprise a phase control on one path.

Optionally, a first output of a first quantum optical switch is connected to an input of a second quantum optical switch, and a second output of the first quantum optical switch is connected to an input of a third quantum optical switch.

Optionally, the physically separated delay media are based on optical fibers.

Optionally, the physically separated delay media are of different lengths.

Optionally, the physically separated delay media are based on one or more waveguides.

Optionally, the physically separated delay media are based on one or more mirrors.

Optionally, the physically separated delay media are based on one or more multipass cells.

Optionally, the physically separated delay media are based on one or more ring resonators.

Optionally, the physically separated delay media are adapted to cause a delay which differs by multiples of a period, based on a photon source duty cycle.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings and formulae. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to digital communication, sensing, and computing, and more particularly, but not exclusively, effective use of single photon detectors (SPDs).

Some embodiments of the present disclosure address the high price and limited count rate of single photon detectors (SPDs). SPDs may be expensive parts of a QKD system. Since more than one SPD may be required in known QKD systems, the price issue is multiplied by the number of SPDs in the system. For example, in polarization based QKD systems information may be transmitted by encoding it into two, mutually conjugated, polarization bases, with two distinctive states—'1' and '0' at each base. This transmission scheme translates into a requirement of four single-photon detectors at the receiving side.

Furthermore, the count rate of QKD systems is limited by the "dead time" of its SPDs. The "dead time" refers to a period after single photon detection in which the SPD is "blind" and cannot detect another photon. As an example, if we use an SPD with dead time of $T_d=50$ ns, then the maximum count rate of the SPD is limited to $C_R=1/T_d=20$ Mcps (Mcps—mega counts per seconds). Another limiting factor of speed of SPD based systems is the possibility of "after-pulse". "After-pulses" are false SPD detection that may appear after a true photon detection, due to long settling time, fluctuations, and/or the like.

Known QKD systems require 3-4 SPDs, and these detectors are usually the cost and the timing constraint of the system, improving detector utilization could have great benefits.

Some embodiments of the present disclosure transform the polarization encoded output of a QKD system to time-bin encoded output at the detector level. This transformation may be used to either reduce the number of SPDs in the system or to increase the count rates by using multiple SPDs to perform sequential measurements.

Some embodiments of the present disclosure are single SPD receivers that enables cost and size reduction of QKD system for handheld and compact uses.

Some embodiments of the present disclosure apply received signal measuring using several single SPD receivers and thereby increase communication speed.

The disclosure may be used for significantly reduced receiver cost and/or an increase of maximum detection speed with minor overhead. Depending on the transmitter technology costs could be reduced by a factor of 3 at the minimum. Rates may be improved by a factor of 3 while maintaining the same cost as the formerly discussed 3-detector system. Some embodiments of the present disclosure may increase the maximum rate linearly with the number of detectors, however other combinations of acceleration and cost reduction may also be implemented.

Before explaining at least one embodiment of the invention in detail, it is to be understood that the invention is not necessarily limited in its application to the details of instructions and the arrangement of the components and/or methods set forth in the following description and/or illustrated in the drawings and/or the Examples. The invention is capable of other embodiments or of being practiced or carried out in various ways.

Figure 1A:
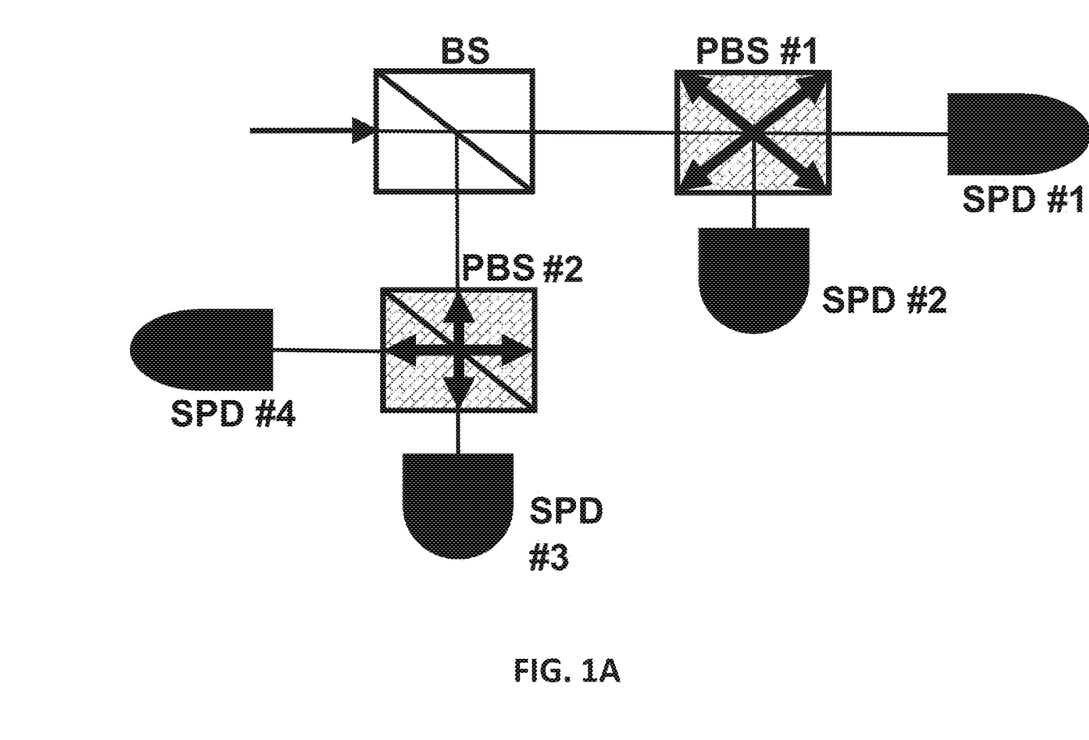
FIG. 1A is a schematic block diagram of an exemplary quantum key receiver according to some embodiments of prior art.

Referring now to the drawings, FIG. 1A which is a schematic block diagram of an exemplary quantum key receiver according to some embodiments of prior art.

In polarization based QKD, information may be transmitted by encoding it into two, mutually conjugated, polarization bases. Each polarization base has two distinctive states—'1' and '0'. This transmission scheme translates into a requirement of four SPDs at the receiving side as shown. A beam splitter (BS) delivers the received light to polarizing beam splitters PBS #1 and PBS #2, and each PBS may deliver the light to either of the SPDs connected thereto according to polarity.

Figure 1B:
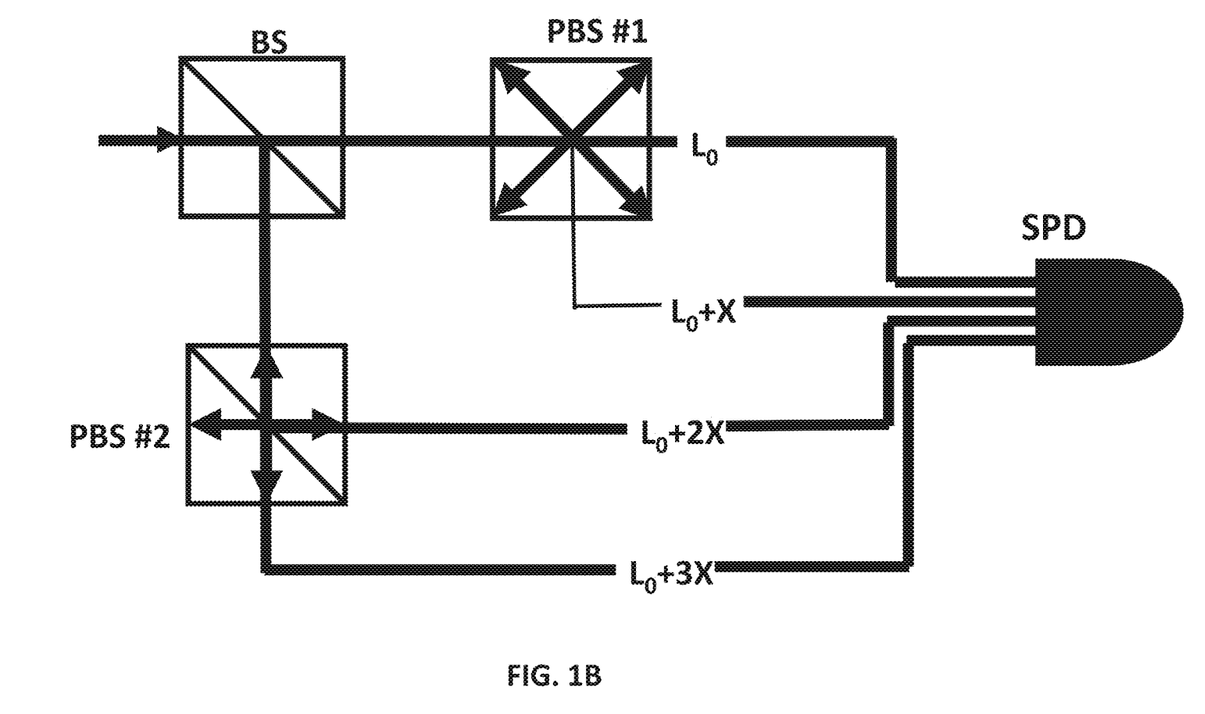
FIG. 1B is a schematic block diagram of an exemplary quantum key receiver according to some embodiments the present disclosure.

Reference is now made to FIG. 1B which is a schematic block diagram of an exemplary quantum key receiver according to some embodiments the present disclosure.

By transforming the coded information from polarization domain into time domain at the detector stage, the disclosed method may reduce the number of required SPDs in the system to one.

The disclosed apparatus may receive at least one photon using receiving optics effective to receive output light of the output optics from a light source, in timing and polarity determined by a protocol.

Some embodiments of the disclosure propose a setup that may divert each polarization state into a unique optical path, or a physically separated delay medium. Each optical path may be of a different length and add a distinct delay to the matching polarization state. By adding a unique and distinguishable delay to each polarization state, the polarization information may be encoded in a time bin scheme and distinguish between the 4 different states with a single SPD. Note that the first stage in both receiver schemes may be identical thus the suggested transformation may be applied to existing systems and apparatuses easily.

Moreover, the disclosed transformation can also be applied to any QKD system which encode information with different polarization states, including 4 linear polarizations—0°, 45°, 90°, 135°, 2 linear+2 circular polarizations—0°, 90°, LCP, RCP, 6 polarization states—0°, 45°, 90°, 135°, LCP, RCP, and other polarization discriminating scheme.

For example, A delay of $L_0$ may be placed between a first output of the polarity beam splitter PBS #1 and the SPD, a delay of $L_0+X$ between a second output of PBS #1 and the SPD, a delay of $L_0+2X$ between a first output of PBS #2 and the SPD, and a delay of $L_0+3X$ between a second output of PBS #2 and the SPD.

The delay period of $L_0$, as well as X, may be determined due to implementation constraints, arbitrary, or derived from frequencies or duty cycles of other parts of the system, for example a duty cycle of a light source or a transmitter that may be used for communicating with the disclosed apparatus. Thereby the physically separated delay media may be adapted to cause a delay which differs by multiples of a period, based on a photon source duty cycle.

This is an exemplary method, for using at least one polarization beam splitter for receiving the at least one photon to output at least one informative bit value, transmitting the at least one photon through one of a plurality of physically separated delay media, each delay medium is characterized by a different, specified delay, and receiving the at least one photon by a device in a measured timing where data comprising the at least one informative bit values is indexed by the measured timing, which may adapted to protocols and system requirements.

The interferometers on one or more of the paths and may be used for connecting and switching delay media. The interferometers may be Mach-Zehnder interferometers (MZI), Michelson interferometer, Sagnac interferometer, and/or the like.

The delay media may comprise on one or more waveguides, mirrors, multipass cells, ring resonators, and the like.

The optical path or delay paths may be based on optical fibers. However, other methods for optical delay can be used with this scheme. For example, by coupling the photons of each polarization state to a waveguide with unique optical length, by building a mirror guided path of different length to each polarization state, coupling the photons of each polarization state to a ring-resonators with different roundtrip times, and/or coupling the photons of each polarization state to a multipass cell with different number of "bounces". Multipass cells may be Pfund cell, White cell, Herriott cell, circular cell, and/or the like. Other light delaying method may also be used. Moreover, the delay is not required to maintain the polarization state of the photons as the polarization projection may occur in the first stage of the receiver, at the PBS.

Since SPDs may be the most expensive components in QKD systems, the disclosure may be useful in situations where price, power consumption and physical dimensions are of concern.

This figure shows a design apt for 4 linear polarizations, however it is apparent to the person skilled on the art how to adapt the disclosure to other polarization schemes, such as six polarization states.

It should also be noted that the delays may or may not be equally spaced, and delay sets such as $L_0+2.5X$, and $L_0+6X$ may also be used.

Figure 2:
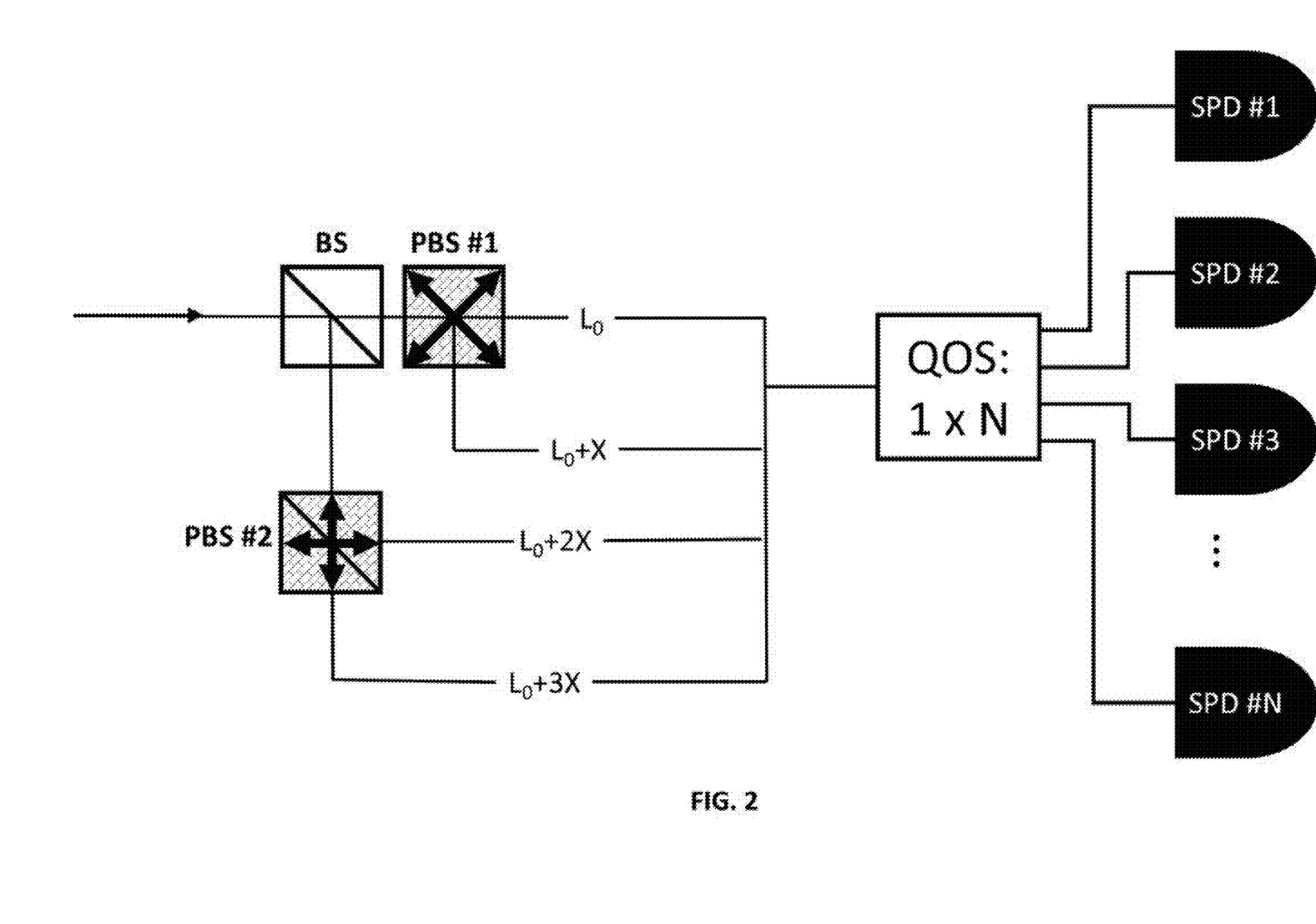
FIG. 2 is a schematic block diagram of another exemplary quantum receiver according to some embodiments the present disclosure.

Reference is now made to FIG. 2 which is a schematic block diagram of another exemplary quantum receiver according to some embodiments the present disclosure.

Some embodiments of the present disclosure aim to increase the bitrate of the system, by adding a quantum optical switch (QOS) at the output of the QKD receiver and redirect the signal between several SPD.

The quantum optical switch may have one input and N optical outputs, wherein N is the number of SPDs in the system. The quantum optical switch may open its outputs in a cyclic fashion, where only a single output is open at a specific time. When the cycle time is longer than the SPDs dead time, the switching may prevent loss of single photon detections due to dead time blindness of an SPD. Moreover, the switching between SPDs, enables after-pulse relaxation for the SPD that preceded the switch.

This is an exemplary method of using a quantum optical switch for delivering the at least one photon to one of separate single photon detectors, selected by a timing scheme.

Some other implementations may use detector output to activate the switching, thereby preventing unnecessary switching, however these implementations may require fast electronic or optic processing, or may apt for limited improvement of the reception rate. It should be noted that N=4 is shown as a non-limiting example for the sake of simplicity, and other number such as 2, 10 or 30 may also be used.

Figure 3:
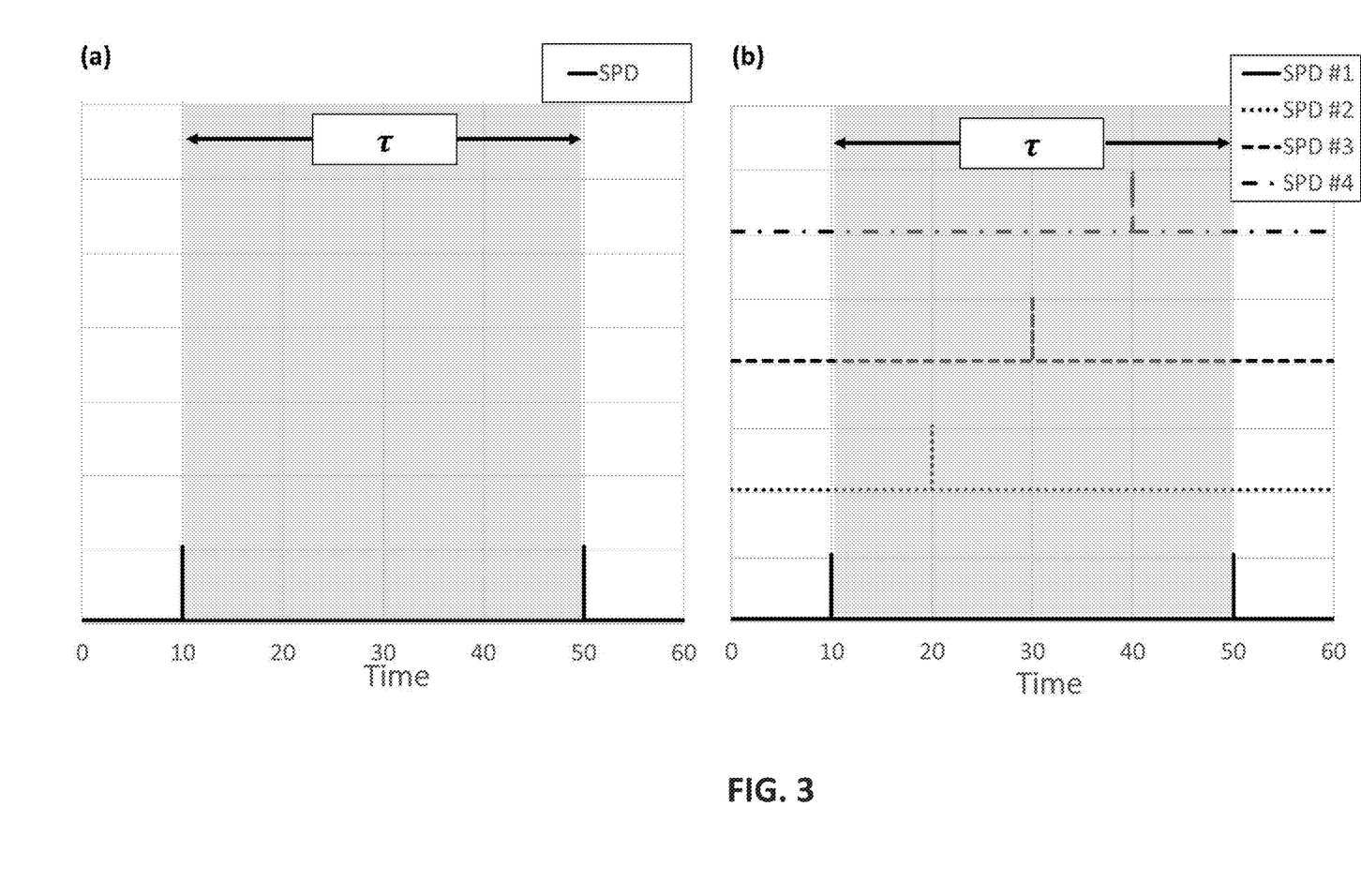
FIG. 3 is two signal vs time graphs of output of an exemplary quantum receiver according to some embodiments the present disclosure.

Reference is now made to FIG. 3 which is two signal vs time graphs of output of an exemplary quantum receiver according to some embodiments the present disclosure.

As an example, the left graph (a) shows the output signal of a QKD system with one SPD with dead time $T_d$=s. The bit rate here is limited by the SPD's dead-time. In the right graph (b), it may be seen that by steering the photon stream between four detectors, the bitrate may be increased by a factor of 4.

In some implementations of QKD scheme there is only a single photon per cycle, and the single photon may appear in any one of the quantum states. Therefore, in some known schemes the rate bound stems from sequences of the same quantum state that may be directed to an associated SPD.

In some implementations of the disclosure, the qubits may be directed to different SPDs regardless of their quantum state, hence the rate limit stems from sending a consecutive photon to the same SPD after a full cycle has elapsed.

Figure 4:
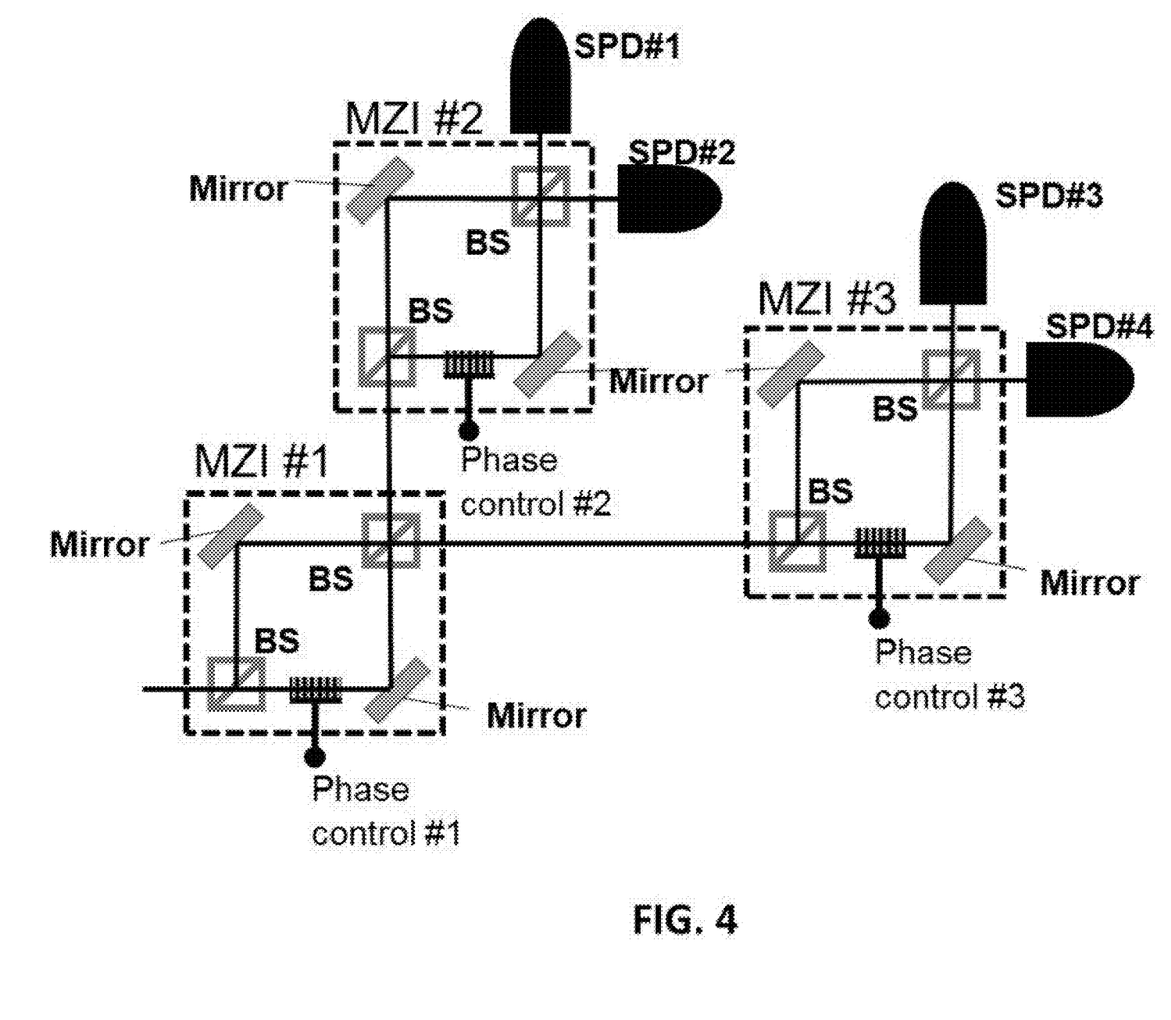
FIG. 4 is a schematic block diagram of an exemplary optical switch for quantum receivers according to some embodiments the present disclosure.

Reference is now made to FIG. 4 which is a schematic block diagram of an exemplary optical switch for quantum receivers according to some embodiments the present disclosure.

The quantum optical switch in the system may be implemented using available technologies for optical switching which may steer all incoming photons from the input to the chosen output. Ubiquitous commercial optical switching devices are based on a mux\de-mux architecture, which split the power between the different outputs and block all but the required one. However, careful consideration may be required in choosing a suitable technology to quantum applications. It must be emphasized that for an optical switch to be suitable for QKD it must transfer the initial photons from input to output, power conservation alone is not a sufficient restriction ("controlled steering" compared to multiplexing). Additionally, high switching speed may be required to utilize the full potential of the single photon switching between the detectors. The overall system's maximum detection frequency will be limited by the lower of the source modulation frequency, the number of detectors divided by the detector dead time ($N/T_d$), and the maximum switching frequency of the quantum switch.

An example is given in FIG. 4, where a scheme of 1×4 optical switch is realized by cascading the outputs of integrated Mach-Zehnder interferometers (MZI). Since each MZI has two outputs, it takes M=$\log_2 N$ control stages to switch between N SPDs which require N−1 MZI. By cascading more MZIs, more SPDs may be used and higher QKD bitrate can be achieved. Alternative implementation may be adapted to different specifications and accordingly use Michelson interferometer, Sagnac interferometer, and/or the like.

The quantum optical switch is realized in free space with beam splitters and mirrors. However, other solutions for fast optical switching can be used with this scheme. For example, each MZI may be realized with multi-mode interferometers (MMIs) as the beam splitters and waveguides at the different optical paths. The entire device may be fabricated as a photonic integrated chip (PIC).

Furthermore, the MZIs may comprise optical fibers and optical fiber splitters, and other light switching method that satisfy the requirements for quantum optical switch may be used.

The quantum optical switch may be based on interferometers, however other switching elements may be incorporated. Furthermore, switches may be more complex, comprising additional complete or partial levels, for example a third level, and may be used in devices such as transmitters, receivers, optical computers, quantum computers, and the like, for sending photons to separate optical processes.

The switch may receive at least one photon using receiving optics effective to receive output light of the output optics from a light source, and use as a quantum and/or optical switch for delivering the at least one photon to one of separate optical outputs, selected by the switch phase control wherein a first output of a first quantum optical switch is connected to an input of a second quantum optical switch, and a second output of the first quantum optical switch is connected to an input of a third quantum optical switch.

It is expected that during the life of a patent maturing from this application many relevant interferometers, beam splitters, optical switches, and single photon detection methods will be developed and the scopes of the terms interferometer, switch, BS, PBS and SPD are intended to include all such new technologies a priori.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicants that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. An apparatus for receiving secure transmission on a transmission link, comprising:
   receiving optics effective to receive output light of output optics from a light source;
   a beam splitter for receiving light from the receiving optics, where at least one photon received is either transmitted by the beam splitter or reflected by the beam splitter;
   at least one polarization beam splitter for receiving the at least one photon to output at least one informative bit value;
   a plurality of physically separated delay media, each delay medium is characterized by a different, specified delay corresponding to one of a plurality of states associated with the at least one photon for encoding the at least one informative bit value; and
   a device for receiving the at least one photon in a measured timing, where data comprising the at least one informative bit value is indexed by the measured timing.

2. The apparatus of claim 1, wherein the device comprising a single photon detector.

3. The apparatus of claim 2, further comprising a quantum optical switch, wherein outputs of the quantum optical switch are connected to separate single photon detectors.

4. The apparatus of claim 3, wherein at least one of the plurality of physically separated delay media is combined with one or more quantum optical switches.

5. The apparatus of claim 4, wherein the one or more quantum optical switches are based on optical interferometers, selected from a group consisting of Mach-Zehnder interferometers (MZI), Michelson interferometer, and Sagnac interferometer.

6. The apparatus of claim 4, wherein the one or more quantum optical switches comprise a phase control on at least one path selection for delivering the at least one photon to one of a plurality of outputs of a respective one of the quantum optical switches.

7. The apparatus of claim 6, wherein the phase control selects one of the plurality of outputs of the respective one of the quantum optical switches for delivering the at least one photon thereto by a timing scheme.

8. The apparatus of claim 6, wherein the phase control selects one of the plurality of outputs of the respective one of the quantum optical switches for delivering the at least one photon thereto in a cyclic fashion.

9. The apparatus of claim 6, wherein the phase control selects one of the plurality of outputs of the respective one of the quantum optical switches for delivering the at least one photon thereto according to a respective quantum state of each of the at least one photon.

10. The apparatus of claim 4, wherein the one or more quantum optical switches comprise at least a first, second, and third quantum optical switch, wherein a first output of the first quantum optical switch is connected to an input of the second quantum optical switch, and a second output of the first quantum optical switch is connected to an input of the third quantum optical switch.

11. The apparatus of claim 1, wherein the plurality of physically separated delay media are based on optical fibers.

12. The apparatus of claim 11, wherein the plurality of physically separated delay media are of different lengths.

13. The apparatus of claim 1, wherein the plurality of physically separated delay media are based on one or more waveguides.

14. The apparatus of claim 1, wherein the plurality of physically separated delay media are based on one or more mirrors.

15. The apparatus of claim 1, wherein the plurality of physically separated delay media are based on one or more multipass cells.

16. The apparatus of claim 1, wherein the plurality of physically separated delay media are based on one or more ring resonators.

17. The apparatus of claim 1, wherein the plurality of physically separated delay media are adapted to cause a delay which differs by multiples of a period, based on a photon source duty cycle.

18. A method for receiving secure transmission on a transmission link, comprising:
   receiving at least one photon using receiving optics effective to receive output light of output optics from a light source;
   using a beam splitter for receiving light from the receiving optics, where the at least one photon received is either transmitted by the beam splitter or reflected by the beam splitter;
   using at least one polarization beam splitter for receiving the at least one photon to output at least one informative bit value;
   transmitting the at least one photon through one of a plurality of physically separated delay media, each delay medium is characterized by a different, specified delay corresponding to one of a plurality of states associated with the at least one photon for encoding the at least one informative bit value; and
   receiving the at least one photon by a device in a measured timing, where data comprising the at least one informative bit value is indexed by the measured timing.

19. A method for receiving an optical signal, comprising:
   receiving at least one photon using receiving optics effective to receive output light of output optics from a light source;
   using one or more of a plurality of quantum optical switches for delivering the at least one photon to one of a plurality of separate optical outputs, selected by a switch phase control, the a plurality of quantum optical switches comprising at least a first, second, and third quantum optical switch, wherein a first output of the first quantum optical switch is connected to an input of the second quantum optical switch, and a second output of the first quantum optical switch is connected to an input of the third quantum optical switch; and
   sending the at least one photon to at least one separate optical process.

20. The method of claim 19, wherein the plurality of quantum optical switches are based on optical interferometers, selected from a group consisting of Mach-Zehnder interferometers (MZI), Michelson interferometer, and Sagnac interferometer.

21. The method of claim 19, wherein the switch phase control selects one of the plurality of separate optical outputs for delivering the at least one photon thereto by a timing scheme.

22. The method of claim 19, wherein the switch phase control selects one of the plurality of separate optical outputs for delivering the at least one photon thereto in a cyclic fashion.

23. The method of claim 19, wherein the switch phase control selects one of the plurality of separate optical outputs for delivering the at least one photon thereto according to a respective quantum state of each of the at least one photon.

24. An apparatus for receiving an optical signal, comprising:
   receiving optics effective to receive output light of output optics from a light source; and
   a plurality of quantum optical switches for delivering the at least one photon to one of a plurality of separate optical outputs, selected by a switch phase control, the a plurality of quantum optical switches comprising at least a first, second, and third quantum optical switch, wherein a first output of the first quantum optical switch is connected to an input of the second quantum optical switch, and a second output of the first quantum optical switch is connected to an input of the third quantum optical switch.

25. The apparatus of claim 24, wherein the plurality of quantum optical switches are based on optical interferometers, selected from a group consisting of Mach-Zehnder interferometers (MZI), Michelson interferometer, and Sagnac interferometer.

26. The apparatus of claim 24, wherein the switch phase control selects one of the plurality of separate optical outputs for delivering the at least one photon thereto by a timing scheme.

27. The apparatus of claim 24, wherein the switch phase control selects one of the plurality of separate optical outputs for delivering the at least one photon thereto in a cyclic fashion.

28. The apparatus of claim 24, wherein the switch phase control selects one of the plurality of separate optical outputs for delivering the at least one photon thereto according to a respective quantum state of each of the at least one photon.

* * * * *